United States Patent
Cottrell et al.

(10) Patent No.: US 12,211,104 B2
(45) Date of Patent: *Jan. 28, 2025

(54) MULTI-CLUSTER POLICY CONSOLIDATION SYSTEM

(71) Applicant: State Farm Mutual Automobile Insurance Company, Bloomington, IL (US)

(72) Inventors: Troy Cottrell, Chenoa, IL (US); Evan Stalter, Normal, IL (US); David Poppen, Gridley, IL (US); Byron Musser, Chenoa, IL (US); Peter R. Wenzel, Bloomington, IL (US); Jay Thomas Parker, Bloomington, IL (US); Mark Bachtold, Fairbury, IL (US); Tyhad Harrison, Bloomington, IL (US); Lynne Wagner, Normal, IL (US); Maximilian Thomas Supryn, Bloomington, IL (US); Isaac Figueroa, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/530,352

(22) Filed: Nov. 18, 2021

(65) Prior Publication Data

US 2022/0164890 A1    May 26, 2022

Related U.S. Application Data

(60) Provisional application No. 63/116,544, filed on Nov. 20, 2020.

(51) Int. Cl.
*G06Q 40/08*    (2012.01)
*G06F 16/23*    (2019.01)

(52) U.S. Cl.
CPC ......... *G06Q 40/08* (2013.01); *G06F 16/2358* (2019.01)

(58) Field of Classification Search
CPC ..................................... G06Q 40/08
See application file for complete search history.

(56) References Cited

U.S. PATENT DOCUMENTS

| | | | |
|---|---|---|---|
| 5,497,486 A * | 3/1996 | Stolfo | G06F 7/32 |
| 5,655,085 A * | 8/1997 | Ryan | G06Q 40/02 |
| | | | 705/4 |

(Continued)

FOREIGN PATENT DOCUMENTS

EP    2846305 A1 *    3/2015    ............. G06F 21/31

OTHER PUBLICATIONS

P. Christen, "A Survey of Indexing Techniques for Scalable Record Linkage and Deduplication," in IEEE Transactions on Knowledge and Data Engineering, vol. 24, No. 9, pp. 1537-1555, Sep. 2012, doi: 10.1109/TKDE.2011.127. (https://ieeexplore.ieee.org/stamp/stamp.jsp?tp=&arnumber=5887335) (Year: 2012).*

(Continued)

*Primary Examiner* — Asha Puttaiah
(74) *Attorney, Agent, or Firm* — Lee & Hayes, P.C.

(57) ABSTRACT

A policy management system can manage a set of insurance policies, for example by performing automated operations to renew policies for subsequent terms. Some insurance policies may be associated with the same household, company, or other insured party, but may be associated with different cars or other insured elements. The policy management system can have a policy consolidator that identifies database records for a target policy and a related source policy, and can consolidate data from the source policy into the record of the target policy. Thereafter, the policy management system can perform policy renewal operations and (Continued)

other policy management operations together based on the consolidated data in the record for the target policy.

20 Claims, 7 Drawing Sheets

(56) References Cited

U.S. PATENT DOCUMENTS

| | | | | |
|---|---|---|---|---|
| 8,650,043 | B1* | 2/2014 | Phillips | G06Q 10/00 |
| | | | | 705/2 |
| 8,719,063 | B1* | 5/2014 | Wade | G06Q 40/08 |
| | | | | 705/4 |
| 10,176,172 | B1* | 1/2019 | Clarke | G06F 16/00 |
| 10,489,388 | B1* | 11/2019 | Rogynskyy | G06F 16/254 |
| 10,489,859 | B1* | 11/2019 | Rugel | G06Q 40/08 |
| 10,503,696 | B1* | 12/2019 | Meyles | G06F 16/215 |
| 10,853,033 | B1* | 12/2020 | Meyles | G06F 7/14 |
| 2004/0193455 | A1* | 9/2004 | Kellington | G06Q 40/08 |
| | | | | 707/999.104 |
| 2005/0131719 | A1* | 6/2005 | Bresnan | G06Q 10/08355 |
| | | | | 705/338 |
| 2012/0023107 | A1 | 10/2012 | Nachnani | |
| 2019/0012743 | A1 | 1/2019 | Resutek | |
| 2019/0370364 | A1* | 12/2019 | Casatelli | G06Q 40/12 |
| 2022/0164889 | A1 | 5/2022 | Cottrell et al. | |

OTHER PUBLICATIONS

Office Action for U.S. Appl. No. 17/530,332, mailed on Oct. 24, 2022, Cottrell, "Policy Consolidation System", 24 Pages.

Office Action for U.S. Appl. No. 17/530,332, mailed on Mar. 9, 2023, Cottrell, "Policy Consolidation System", 31 pages.

Office Action for U.S. Appl. No. 17/530,332, mailed on Jul. 7, 2023, Cottrell, "Policy Consolidation System", 22 pages.

Office Action for U.S. Appl. No. 17/530,332, mailed on Nov. 7, 2023, Troy Cottrell, "Policy Consolidation System", 22 pages.

* cited by examiner

MULTI-CLUSTER POLICY CONSOLIDATION SYSTEM

RELATED APPLICATIONS

This U.S. patent application claims priority to provisional U.S. Patent Application No. 63/116,544, entitled "MULTI-CLUSTER POLICY CONSOLIDATION SYSTEM," filed on Nov. 20, 2020, the entirety of which is incorporated herein by reference.

TECHNICAL FIELD

The present disclosure relates to management of insurance policies, particularly with respect to consolidating multiple insurance policies into one insurance policy.

BACKGROUND

Individuals, companies, and other entities often hold insurance policies with insurance companies. For example, insurance policies can include automobile insurance policies, fire insurance policies, and other types of insurance policies. Insurance companies can use computer-implemented policy management systems to store information about insurance policies, create new insurance policies, change existing insurance policies, and/or otherwise manage insurance policies.

In some cases, a single entity may have multiple insurance policies of the same type with the same insurance company. For example, if an individual owns multiple automobiles, the individual may have multiple automobile insurance policies that cover different automobiles.

However, it can be inefficient to separately manage multiple related insurance policies for the same insured party. For example, a policy management system may need to create, store, and manage separate digital records for each of the different insurance policies. Separately managing distinct records for related insurance policies can be complex, and/or use large amounts of storage space in databases. Additionally, in some examples, records for different related insurance policies may be stored in databases of different servers or server clusters. Accordingly, an instance of the policy management system executing in a first cluster may not be able to access data about related insurance policies that are stored in a second cluster.

As another example, each related insurance policy may have a different policy number. This can lead to confusion and/or frustration for customers, and/or lead to an inefficient use of resources for the insurance company. For example, the insurance company may routinely send letters, emails, or other notifications to insured parties regarding their insurance policies. However, because each related insurance policy may have a different policy number and be considered a different insurance policy, the insurance company may send a customer numerous copies of essentially the same notification for each different insurance policy associated with the customer. For example, if an individual has two insured automobiles, the individual may receive two emails and/or two letters in the mail about the insurance coverage for each automobile that explains the same type of regulatory notice, because each automobile is covered under a different automobile insurance policy with a different policy number. It can be inefficient for the insurance company to send numerous communications with substantially duplicated information to the same individual in such cases. For example, an email server associated with the insurance company may use extra processing cycles, memory, and bandwidth to generate and send multiple email messages containing similar content to the same individual. It can also be frustrating or confusing for customers to receive substantially duplicated communications that may be similar or identical in content, except for the associated policy number.

As yet another example, different related insurance policies may have different terms, and thus come up for renewal at different times. For instance, if an individual has two insurance policies that cover two different automobiles, the term of the first insurance policy may end in July while the term of the second insurance policy may end in September. Accordingly, the first insurance policy may come up for renewal months before the second insurance policy. This may be confusing for the individual, who may expect that both insurance policies would renew at the same time. It may also be frustrating or confusing for the individual to receive renewal notices for the first insurance policy, and then receive separate renewal notices for the second insurance policy a few months later.

It can also be inefficient and/or complex for the insurance company to separately manage terms and renewals for different insurance policies that are related to one another. For example, an email server associated with the insurance company may use extra processing cycles, memory, and bandwidth to generate and send multiple renewal notices to the same customer via email in association with related insurance policies. As another example, the insurance company may use digital records to store information associated with insurance policies. However, separately managing related insurance policies may increase the amount of computer memory used to store corresponding digital records, and can increase the amount of processing cycles and other computing resources used to manage and process the digital records.

The example systems and methods described herein may be directed toward mitigating or overcoming one or more of the deficiencies described above.

SUMMARY

Described herein are systems and methods that can consolidate information about different insurance policies into a combined insurance policy. A policy management system can identify database records for related insurance policies, such as a first automobile insurance policy for a first vehicle and a second automobile insurance policy for a second vehicle owned by the same party, and can consolidate the information into a single database record that represents a consolidated insurance policy. For example, the consolidated insurance policy can cover both the first vehicle and the second vehicle. Such consolidation can simplify management of the insurance policies. For example, the insurance coverage for both vehicles can renew at the same time going forward after the consolidation, which can lead to more efficient renewal of the insurance policies and/or reduce customer confusion that may occur when related insurance policies renew at different times. For instance, consolidating multiple related insurance policies can reduce bandwidth usage by reducing the number of email messages or other electronic notifications that are sent over a network in association with renewals of the insurance policies, and/or reduce the number of processing cycles used to generate and send such electronic notifications. Additionally, consolidating information about multiple related insurance policies into a single database record can decrease the size of a database, and/or reduce the amount of processor cycles and other computing resources that are used to process the digital records.

According to a first aspect, a policy management system can include a first cluster having a first database storing a first set of insurance policy records. The policy management system can also include a second cluster having a second database storing a second set of insurance policy records. The policy management system can further include a policy consolidator configured to identify, in the first database or the second database, a first record corresponding to a target policy representative of a first insurance coverage. The policy consolidator can also be configured to identify, in the first database or the second database, a second record corresponding to a source policy representative of a second insurance coverage. The policy consolidator can additionally be configured to determine that the first record is characterized by a set of attributes, and determine that the second record is also characterized by the set of attributes. The policy consolidator can further be configured to add, based on determining that the first record and the second record are characterized by the set of attributes, a set of policy data from the second record to the first record. The adding can cause the first record to represent both the first insurance coverage and the second insurance coverage, and can cause renewals of the first insurance coverage and the second insurance coverage to occur in association with the first record. The policy consolidator can also be configured to withdraw a pending future renewal of the source policy in association with the second record.

According to a second aspect, a computer-implemented method can include assigning, by a policy management system, a set of records to a set of databases associated with a set of clusters, wherein each record of the set of records corresponds to a respective insurance policy. A first record, of the set of records, can represent a first insurance coverage, and a second record, of the set of records, can represent a second insurance coverage. The method can include determining, by the policy management system, that the first record and the second record are characterized by a set of common attributes. The method can also include, adding, by the policy management system, and based on determining that the first record and the second record are characterized by the set of common attributes, a set of policy data from the second record to the first record. The adding can cause the first record to represent both the first insurance coverage and the second insurance coverage, and cause renewals of the first insurance coverage and the second insurance coverage to occur in association with the first record. The method can further include withdrawing, by the policy management system, a pending future renewal of the source policy in association with the second record.

According to a third aspect, one or more computing devices can include one or more processors and memory storing computer-executable instructions that, when executed by the one or more processors, cause the one or more processors to perform operations. The operations can include identifying, in a set of databases associated with a set of clusters that store different sets of insurance policy records, a first record corresponding to a target policy representative of a first insurance coverage. The operations can also include identifying, in the set of databases, a second record corresponding to a source policy representative of a second insurance coverage. The operations can also include determining that the first record is characterized by a set of attributes, and that the second record is also characterized by the set of attributes. The operations can further include adding, based on determining that the first record and the second record are characterized by the set of attributes, a set of policy data from the second record to the first record. The adding can cause the first record to represent both the first insurance coverage and the second insurance coverage, and cause renewals of the first insurance coverage and the second insurance coverage to occur in association with the first record. The operations can also include withdrawing a pending future renewal of the source policy in association with the second record.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
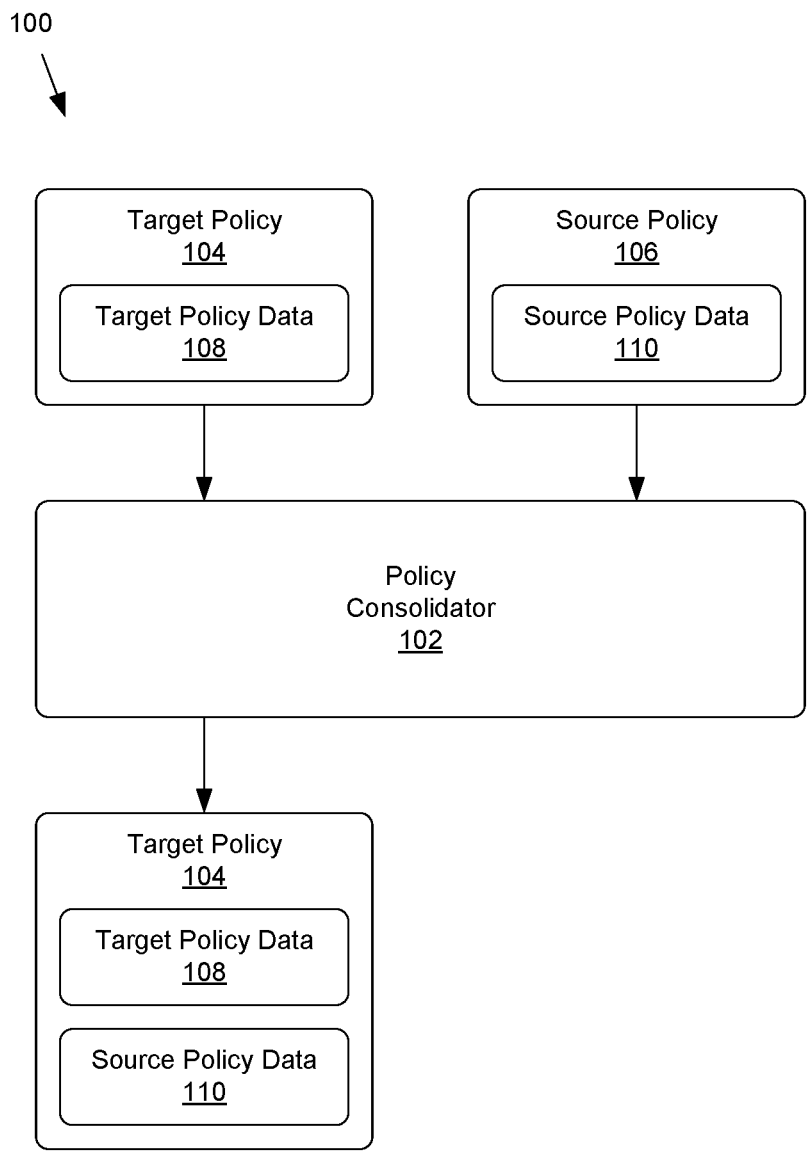
FIG. 1 shows an example of a policy consolidator that can consolidate multiple insurance policies that are associated with the same insured party.

FIG. 1 shows an example 100 of a policy consolidator 102 that can consolidate multiple insurance policies that are associated with the same insured party. An insurance company may offer one or more types of insurance policies, such as automobile insurance policies, fire insurance policies, workers compensation insurance policies, life insurance policies, and/or other types of insurance policies. In some cases, an insured party may have more than one insurance policy of the same type with the same insurance company. For example, a household may have two different automobile insurance policies that each cover a different vehicle owned by members of the household. As another example, a company may operate a fleet of vehicles, and may have different insurance policies for each different vehicle in the fleet.

The policy consolidator 102 can be a computer-implemented component associated with a policy management system that can be executed by one or more computing devices, for example as discussed below with respect to FIG. 7. The policy management system can manage one or more types of insurance policies, and can have databases, user interfaces, batch processing components, and/or other computing elements that allow information about insurance policies to be stored, viewed, edited, and/or managed. For example, the policy management system can store digital records associated with one or more sets of insurance policies in one or more databases. Examples of policy management systems that can be associated with the policy consolidator 102 are discussed below with respect to FIGS. 2-5.

The policy consolidator 102 can be configured to consolidate multiple insurance policies associated with the same insured party into a single insurance policy. For example, the policy consolidator 102 can consolidate separate automobile insurance policies for two different cars associated with the same insured party into a single insurance policy, such that both cars become covered by one automobile insurance policy. The policy consolidator 102 can consolidate related insurance policies by identifying digital records for related insurance policies in one or more databases, and by combining data from the digital records into a single digital record for the consolidated insurance policy.

For example, the policy consolidator 102 can be configured to identify, based on a set of digital records that are accessible to the policy consolidator 102, two insurance policies that can be consolidated. The policy consolidator 102 can consider one of the insurance policies to be a target policy 104, and the other insurance policy to be a source policy 106 that can be consolidated into the target policy 104. After identifying the target policy 104 and the source policy 106, the policy consolidator 102 can consolidate the insurance policies by adding data from the digital record of the source policy 106 into the digital record of the target policy 104, as explained in further detail below. Accordingly, the digital record for the target policy 104 can represent both insurance policies after the consolidation.

The target policy 104 can be a first insurance policy that is managed by the policy management system associated with the policy consolidator 102. The source policy 106 can be a second insurance policy that is associated with the same insured party as the target policy 104. The insured party can be an individual, a household, a company, or any other entity. For example, the target policy 104 and the source policy 106 can be different personal automobile insurance policies associated with the same individual or household. As another example, the target policy 104 and the source policy 106 can be different commercial automobile insurance policies associated with the same company, such as a taxi company, a delivery company, or another business that operates a fleet of vehicles.

In some examples, the target policy 104 and the source policy 106 can be different insurance policies that are both actively being managed by the policy management system associated with the policy consolidator 102. For example, the target policy 104 and the source policy 106 can be represented by existing records in one or more databases of the policy management system.

In other examples, the target policy 104 can be an existing insurance policy that is actively being managed by the policy management system, while the source policy 106 is a new insurance policy or an existing insurance policy that is being migrated to the policy management system from another source. For example, the source policy 106 may be a previously-existing insurance policy that is being migrated to the policy management system from a different legacy system, such as an older policy management system or different type of policy management system, while the target policy 104 may be another insurance policy that was migrated from the legacy system to the policy management system at an earlier point in time.

In some examples, an insurance policy may be migrated from a legacy system, or other system, to the policy management system at a point in time that is tied to an upcoming renewal of the insurance policy for a subsequent term. For instance, if an insurance policy is set to renew fifty days prior to an end of a term, the insurance policy may be migrated from a legacy system at a point in time that is seventy days prior to the end of the term, such that the new policy management system can process the renewal of the insurance policy.

In some examples, the policy management system can "bind" an insurance policy when the insurance policy is imported or migrated into the policy management system, or when a renewal process for the insurance policy has begun after the insurance policy has been imported into the policy management system. Accordingly, in some examples the target policy 104 may be a first insurance policy that has already been "bound" by the policy management system, such as an insurance policy that was previously migrated into the policy management system, and for which the policy management system has already initiated a renewal process by causing one or more renewal notices to be sent before a termination of the current term of the insurance policy. In these examples, the source policy 106 may be a second insurance policy that has been migrated into the policy management system due to an upcoming renewal of the second insurance policy, but that has not yet been "bound" into the policy management system because the policy management system has not yet initiated a renewal process associated with the second insurance policy.

The digital record of the target policy 104 can include target policy data 108 associated with the target policy 104. The digital record of the source policy 106 can similarly include source policy data 110 associated with the source policy 106. The target policy data 108 and the source policy data 110 can be policy data that indicates information about the corresponding insurance policies. Policy data for an automobile insurance policy can include one or more of: a client identifier, a policy number, an insurance company identifier, an insurance agent identifier, an address, a vehicle identifier, mandatory coverage information, vehicle use information, a guaranteed renewal status, a term, a term length, renewal dates, driver exclusions, billing methods, billing accounts, and/or other types of information. Policy data for other types of insurance policies may include similar types of information relevant to the other types of insurance policies.

The policy consolidator 102 may be configured to evaluate information associated with an insurance policy, and determine if the insurance policy is a source policy that can be consolidated into a corresponding target policy, upon the occurrence of a trigger event. The trigger event may be associated with an import or migration of a data record or other information associated with the insurance policy into the policy management system, be associated with a renewal of the insurance policy, be associated with a user instruction to evaluate the insurance policy for possible consolidation, be associated with a new insurance quote, and/or be associated with any other event or condition. Accordingly, if the trigger event occurs with respect to an insurance policy managed by the policy management system, the policy consolidator 102 can consider that insurance policy to be a candidate source policy, and can determine if a target policy exists that is associated with the candidate source policy. If the policy consolidator 102 does not identify a corresponding target policy for the candidate source policy in response to the trigger event, the policy consolidator 102 can leave the candidate source policy unchanged. However, if the policy consolidator 102 does identify a target policy that corresponds to the candidate source policy in response to the trigger event, the policy consolidator 102 can determine that the candidate source policy is a source policy and can consolidate the source policy into the target policy as described herein.

In some examples, the trigger event may be an import of a candidate source policy into the policy management system. For example, the policy consolidator 102 may be configured to evaluate, as a candidate source policy, a new insurance policy that is associated with a new digital record being added to the policy management system, or that was added to the policy management system in the past day, week, month, or other threshold period of time. As another example, the policy consolidator 102 may be configured to evaluate, as a candidate source policy, an existing insurance policy that is associated with data being migrated into the policy management system from a legacy system or other source, or that was migrated to the policy management system in the past day, week, month, or other threshold period of time. Accordingly, upon the import of a digital record or other information associated with a new insurance policy or a migrated insurance policy, the policy consolidator 102 can determine if the new or migrated insurance policy is a source policy that can be consolidated into a target policy.

In other examples, the trigger event may be associated with a renewal date and/or an expiration date of a candidate source policy. For example, an insurance policy may have a six-month term, and be set to undergo a renewal process fifty days before the end of the current six-month term that may renew the insurance policy for a subsequent six-month term. In this example, the policy consolidator 102 may be configured to evaluate the insurance policy, as a candidate source policy, seventy days prior to the end of the current term of the insurance policy, or at any other time relative to the expiration of the current term of the candidate source policy. Accordingly, as an insurance policy nears renewal, the policy consolidator 102 can determine if that insurance policy is a source policy that can be consolidated into a target policy.

In still other examples, the trigger event may be a user instruction that prompts the policy consolidator 102 to evaluate whether a particular insurance policy is a source policy that can be consolidated into a target policy. For example, an insurance agent may input a user instruction to the policy management system that requests that a particular insurance policy be consolidated into other related insurance policies, if one or more related insurance policies exist. The user instruction may cause the policy consolidator 102 to search for other related insurance policies and determine whether the particular insurance policy is a source policy that can be consolidated into a target policy.

In yet other examples, the trigger event may be associated with a generation of a new insurance quote. For example, a user may be shopping for insurance on a new car on a website associated with the policy management system, and the policy consolidator 102 can identify one or more existing insurance policies that are already associated with the user. The policy consolidator 102 may be configured to consider the potential new insurance policy as a candidate source policy and consolidate the candidate source policy with an existing target policy that is associated with the user, so that a quote can be generated and displayed on the website for the consolidated insurance policies. In this situation, the consolidation of the existing and potential insurance policies may be temporary or provisional if the user has not accepted the quote. However, the consolidation of the insurance policies can be accepted, and corresponding information can be stored in one or more databases, if the user chooses to accept the quote associated with the consolidated insurance policies.

The policy consolidator 102 can be configured to determine that two insurance policies can be categorized as the target policy 104 and the related source policy 106 when both insurance policies have a predefined set of attributes in common. As an example, the predefined set of attributes may indicate that two insurance policies can be consolidated if policy data for the two insurance policies indicates the same client identifier, the same named insured party, the same mutual or standard insurance company, the same insurance agent, the same residential or garage address, the same mandatory coverages, the same vehicle use information, the same guaranteed renewal status, the same term length, renewal dates that are not less than 10 days (or any other threshold period of time) apart, the same driver exclusions, and the same billing method and/or billing account. In some examples, the predefined set of attributes can be configurable, and/or can include more, fewer, or different attributes than the example predefined set of attributes discussed above.

As an example, the policy consolidator 102 can process an input insurance policy, such as a new insurance policy, an insurance policy that is up for renewal within a threshold period of time, or an insurance policy that is being migrated to the policy management system, as a candidate source policy. The policy consolidator 102 can determine a client identifier of the candidate source policy, and can determine if another insurance policy managed by the policy management system is also associated with that client identifier. The client identifier may be a name, a number, a string of alphanumeric characters, or any other data that can uniquely identify an insured party. Accordingly, the policy consolidator 102 may identify one or more other insurance policies that have the same client identifier as the candidate source policy.

In this example, if the policy consolidator 102 does identify another insurance policy that is associated with the same client identifier as the candidate source policy, the policy consolidator 102 can determine if a predefined set of other attributes of the two insurance policies also match. For example, the policy consolidator 102 can determine if policy data for the two insurance policies indicates the same named insured party, the same mutual or standard insurance company, the same insurance agent, the same residential or garage address, the same mandatory coverages, the same vehicle use information, the same guaranteed renewal status, the same term length, renewal dates that are not less than 10 days (or any other threshold period of time) apart, the same driver exclusions, and the same billing method and/or billing account. If the two insurance policies do both match with respect to the client identifier and the predefined set of other attributes, the policy consolidator 102 can consider the input insurance policy to be the source policy 106, and the other matching insurance policy to be the target policy 104.

After identifying the target policy 104 and the source policy 106, the policy consolidator 102 can edit the digital record of the target policy 104 to add at least a portion of the source policy data 110 of the source policy 106 to the digital record of the target policy 104, as shown in FIG. 1. Accordingly, the target policy data 108 of the target policy 104 and the source policy data 110 of the source policy 106 can be stored in a database record associated with the target policy 104, and thereby consolidate the source policy 106 into the target policy 104.

Consolidating information about the target policy 104 and the source policy 106 into the digital record for the target policy 104 can reduce the total number of digital records representing active insurance policies in one or more databases, and can allow the policy management system to more efficiently process and manage the insurance policies. As an example, if the target policy 104 initially represented automobile insurance for a first car associated with an insured party, and the source policy 106 initially represented automobile insurance for a second car associated with the same insured party, the digital record for the target policy 104 can represent automobile insurance for both cars after the consolidation. Accordingly, future renewal notices and other notifications associated with the automobile insurance for both cars can be sent together based on the digital record for the consolidated target policy 104, future renewals for the automobile insurance for both cars can be processed together based on the digital record for the consolidated target policy 104, and/or other management of the automobile insurance for both cars can be managed together based on the digital record for the consolidated target policy 104.

In some examples, the policy consolidator 102 can add at least some source policy data 110 from the source policy 106 to the digital record of the target policy 104 during consolidation. For example, the policy consolidator 102 can copy a vehicle identifier, coverage amount, driver identifier, and/or other information from the source policy 106 to the target policy 104. In some examples, the policy consolidator 102 may omit adding or copying some data that is the same in the source policy 106 to the target policy 104. For example, the policy consolidator 102 may have determined that the source policy 106 and the target policy 104 are associated with the same insurance agent, the same address, and/or other identical attributes as discussed above. Accordingly, in some examples the policy consolidator 102 may avoid copying duplicated information from the source policy 106 to the target policy 104.

In addition, the policy consolidator 102 may be configured to avoid adding certain specified data from the source policy 106 to the target policy 104. For example, the policy consolidator 102 may be configured to avoid adding a policy number of the source policy 106, and/or term information about the source policy 106, to the target policy 104. Accordingly, the portion of the source policy data 110 that is copied from the source policy 106 to the target policy 104 can become associated with a policy number, a term, and/or other specified data of the target policy 104.

As a first example, the target policy 104 may initially have a first policy number and the source policy 106 may initially have a second policy number. However, the policy consolidator 102 can be configured to consolidate the insurance policies such that the target policy 104 continues to be associated with the first policy number, and the policy number of the source policy 106 is not copied to the target policy 104. Accordingly, both the target policy data 108 and the source policy data 110 can become associated with the first policy number after the consolidation.

As a second example, the target policy 104 and the source policy 106 may initially have different terms, although the different terms may in some situations have the same length. For example, the target policy 104 may have had a term for insurance on a first car that extends from January 1 to July 1, while the source policy 106 may have had a term for insurance on a second car that extends from February 1 to August 1. The policy consolidator 102 can be configured to consolidate the insurance policies such that the target policy 104 continues to have the January 1 to July 1 term after the consolidation, even though the consolidation causes the target policy 104 to become associated with both the first car and the second car. Although the insurance for the second car may not have been set to renew until August 1 prior to consolidation according to the source policy 106, after consolidation the insurance for both cars can be set to renew on July 1 according to the term associated with the target policy 104.

In some examples, the initial database record for the source policy 106 can continue to be stored in a database after the source policy data 110 has been copied into the database record for the target policy 104. However, the record for the source policy 106 can be edited or categorized such that the source policy 106 is not set to be renewed on its own. For example, the policy consolidator 102 can change a renewal flag in the record for the source policy 106, place the record for the source policy 106 in a draft status, or otherwise edit data associated with the source policy 106 to indicate that the source policy 106 will not be renewed. This can cause the source policy 106 to expire as a separate insurance policy at the end of the current term of the source policy 106. As discussed above however, the insurance coverage previously represented by the source policy 106 can continue as part of the target policy 104.

In some examples, if the policy consolidator 102 identifies three or more insurance policies that share the same client identifier and also match other attributes in the predefined set of attributes, the policy consolidator 102 may consider a first one of the insurance policies to be the target policy 104 and a second one of the insurance policies to be the source policy 106. The policy consolidator 102 can consolidate the source policy 106 into the target policy 104 as discussed above. The policy consolidator 102 can then consider an additional one of the insurance policies to be a next source policy, and consolidate that next source policy into the target policy 104.

Accordingly, the target policy 104 may be consolidated with multiple source policies, such that the target policy 104 can be modified to represent insurance coverage for any number of insured elements. For example, a set of personal automobile insurance policies associated with three or more cars of a household can be consolidated into a single target policy. As another example, a set of commercial automobile insurance policies for a fleet of vehicles associated with a business can be consolidated into a single target policy.

Overall, identifying and consolidating related insurance policies can allow the policy management system to more efficiently manage the insurance policies. For example, after the source policy 106 has been consolidated into the target policy 104 as discussed above, the policy management system can store data about the consolidated insurance policies in the digital record of the target policy 104. The separate digital record of the source policy 106 may be stored or archived, but the policy management system may manage the consolidated insurance policies based on the digital record of the target policy 104 after the consolidation. The consolidation can accordingly reduce the number of digital records stored in one or more databases that represent active insurance policies, and/or reduce the amount of processing cycles, memory, and/or other computing resources used to manage and/or process such digital records. As another example, because consolidating related insurance policies together can cause the insurance policies to become associated with the same policy number and term, the consolidated insurance policies can be renewed together. The consolidation can accordingly reduce the number of email messages or electronic notifications that are generated and sent to customers in association with insurance policy renewals, and thereby reduce the amount of processing cycles used to generate the notifications, reduce bandwidth usage used to send the notifications, and/or otherwise reduce the amount of computing resources used to manage and/or implement renewals of insurance policies.

As discussed above, the policy consolidator 102 can be part of a policy management system that stores digital records that represent insurance policies, such as the target policy 104 and the source policy 106, in one or more databases. Examples of such a policy management system are shown and described below with respect to FIGS. 2-5.

Figure 2:
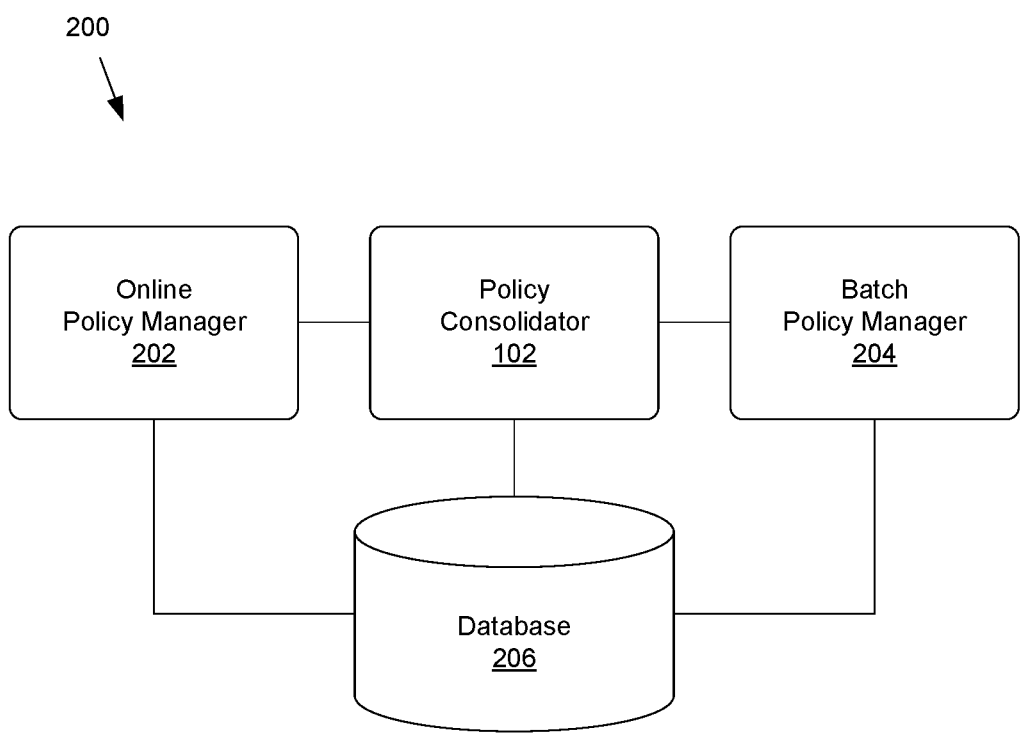
FIG. 2 shows a first example of a policy management system that can be associated with the policy consolidator.

FIG. 2 shows a first example 200 of a policy management system that can be associated with the policy consolidator 102. The policy management system can be a computer-implemented system that includes an online policy manager 202 and/or a batch policy manager 204, as well as a database 206. The database 206 can store information about a set of insurance policies. For example, the database 206 can store records for a set of insurance policies, including the target policy 104 and the source policy 106 discussed above with respect to FIG. 1. The online policy manager 202 and/or the batch policy manager 204 can be linked to the database 206, such that the online policy manager 202 and/or the batch policy manager 204 can access policy data in the database 206, edit policy data in the database 206, and/or otherwise interact with policy data in the database 206. In some examples, the policy management system may include multiple instances of the online policy manager 202 and/or the batch policy manager 204, which may each interface with the same database 206 or mirrored and/or synced instances of the same database 206.

The online policy manager 202 can be a user-facing component of the policy management system. For example, the online policy manager 202 can have a user interface and/or an application programming interface (API) that allows users to view policy data about insurance policies stored in the database 206, edit policy data about insurance policies stored in the database 206, create new insurance policies and store corresponding data in the database 206, and/or otherwise interact with policy data of records in the database 206. As an example, an insurance agent may use the user interface of the online policy manager 202 to view and/or edit policy data for insurance policies associated with customers of the insurance agent.

The batch policy manager 204 may be a back-end component that is configured to perform automated operations with respect to one or more insurance policies, based on policy data in corresponding records stored in the database 206. In some examples, the batch policy manager 204 may be configured to automatically perform operations associated with renewing a batch of insurance policies. For example, the batch policy manager 204 can be configured to identify a batch of insurance policies that have current terms that are set to expire within a threshold period of time, such as fifty days, seventy days, or any other predetermined period of time, and automatically perform operations to initiate renewals of the insurance policies for new terms that will begin upon expiration of the current terms. In some examples, the batch policy manager 204 can be configured to perform batch operations on a nightly basis, during periods of time in which the online policy manager 202 may be less likely to be used. In other examples, the batch policy manager 204 can be configured to perform batch operations on any other periodic, occasional, or scheduled basis, and/or on demand.

The online policy manager 202 and/or the batch policy manager 204 can be associated with the policy consolidator 102 described above with respect to FIG. 1. In some examples, the policy consolidator 102 can be a component of the online policy manager 202 and/or the batch policy manager 204. In other examples, the policy consolidator 102 can be a separate component of the policy management system, which the online policy manager 202 and/or the batch policy manager 204 can access or initiate.

In some examples, the policy consolidator 102 may operate as part of, or in association with, batch processes performed by the batch policy manager 204. For example, as the batch policy manager 204 automatically processes renewals for a batch of insurance policies, the policy consolidator 102 may determine if any insurance policies in the batch of insurance policies can be consolidated with any other existing insurance policies, instead of being renewed on their own. For instance, the batch policy manager 204 may process renewals for a batch of insurance policies that includes the source policy 106 shown in FIG. 1. As part of the renewal operations associated with the batch policy manager 204, the policy consolidator 102 may identify the target policy 104 shown in FIG. 1 as being associated with the source policy 106, for example because the source policy 106 has the same client identifier as the target policy 104, and another predefined set of attributes about the target policy 104 and the source policy 106 match. The policy consolidator 102 can in turn add source policy data 110 from the record of the source policy 106 into the record of the target policy 104 in the database 206, such that the source policy 106 becomes consolidated into the target policy 104. The policy consolidator 102 can also configure the source policy 106 to not be renewed on its own. For instance, after a successful consolidation of the source policy 106 into the target policy 104, the policy consolidator 102 can change a renewal flag associated with the source policy 106, place the record for the source policy 106 in a draft status, or otherwise withdraw the source policy 106 from being renewed on its own as part of the batch renewal operations. Accordingly, insurance coverage previously represented by the source policy 106 can continue, and/or can be renewed in the future, with respect to the target policy 104 instead of the source policy 106.

As another example, the policy consolidator 102 may be initiated by a user command received through the online policy manager 202. For instance, if an insurance agent or other user is using the online policy manager 202 to view information about a particular insurance policy, the user may click a user interface element or input another type of instruction that causes the policy consolidator 102 to evaluate whether that particular insurance policy can be consolidated with any other insurance policies. Based on the user instruction, the policy consolidator 102 can search the database 206 for records of one or more other insurance policies that share a client identifier with the particular insurance policy and that also match another predefined set of attributes. If the policy consolidator 102 identifies another insurance policy that can be consolidated with the particular insurance policy in response to the user instruction, the policy consolidator 102 can consolidate the insurance policies into a single insurance policy represented by a single record as discussed above, either automatically or upon receipt of a user confirmation that the insurance policies should be consolidated.

In the example shown in FIG. 2, the policy consolidator 102, the online policy manager 202, and/or the batch policy manager 204 may have access to a set of digital records stored in one or more instances of the same database 206. However, in other examples, the policy management system may have multiple databases that store different sets of digital records, for instance as discussed below with respect to FIG. 3-5.

Figure 3:
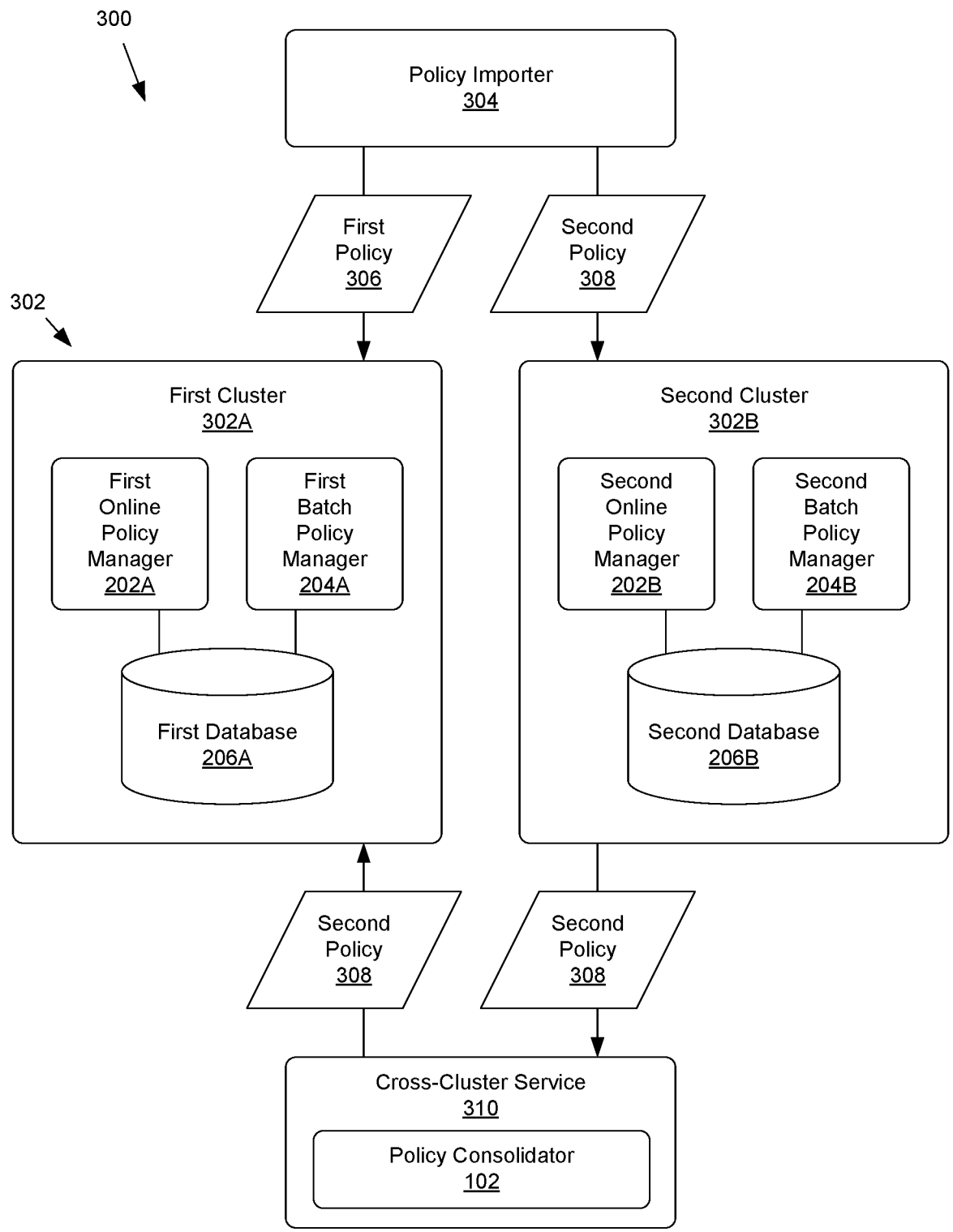
FIG. 3 shows a second example of a policy management system in which the policy consolidator can execute in association with multiple clusters.

FIG. 3 shows a second example 300 of a policy management system in which the policy consolidator 102 can execute in association with multiple clusters 302. The clusters 302 can include at least a first cluster 302A and a second cluster 302B as shown in FIG. 3. Each of the clusters 302 may be associated with, and/or be executed by, a different set of one or more servers or other computing elements. Each cluster can include at least some of the elements discussed above with respect to FIG. 2, such as one or more instances of the online policy manager 202, one or more instances of the batch policy manager 204, and/or one or more databases. Accordingly, in some examples, different clusters 302 may represent different instances of the policy management system discussed above with respect to FIG. 2.

Different clusters 302 may have different databases that hold records for different sets of insurance policies. The databases may be similar to the database 206 discussed above with respect to FIG. 2. For example, an insurance company that provides a large number of insurance policies to its customers may store policy data for different sets of insurance policies in distinct databases of two clusters 302, three clusters 302, four clusters 302, five clusters 302, or any other number of clusters 302. In some examples, if the storage space allocated to a database of one cluster becomes full or becomes filled to above a threshold level, a new instance of the policy management system with a new and separate database can be spun up or created with respect to a new cluster, such that more storage space for policy data becomes available in the new cluster.

Elements in one cluster may be at least partially isolated from elements in other clusters 302. For example, an instance of the online policy manager 202, an instance of the batch policy manager 204, and/or a database in one cluster may not be in direct communication with other instances of the online policy manager 202, other instances of the batch policy manager 204, and/or databases in other clusters. Accordingly, policy data stored in the database of one cluster may not be directly accessible by instances of the online policy manager 202 or the batch policy manager 204 in other clusters.

As an example, the first cluster 302A may include one or more instances of a first online policy manager 202A and/or a first batch policy manager 204A, which can be in communication with a first database 206A of the first cluster 302A. The second cluster 302B may similarly include one or more instances of a second online policy manager 202B and/or a second batch policy manager 204B, which can be in communication with a second database 206B of the second cluster 302B. In this example, the first database 206A in the first cluster 302A may store records for a first set of insurance policies, while the second database 206B may store records for a second set of insurance policies. Accordingly, the first online policy manager 202A and the first batch policy manager 204A in the first cluster 302A may not have access to information about the second set of insurance policies stored in the second database 206B of the second cluster 302B. Similarly, the second online policy manager 202B and the second batch policy manager 204B in the second cluster 302B may not have access to information about the first set of insurance policies stored in the first database 206A of the first cluster 302A.

The policy management system may have a policy importer 304 that assigns insurance policies to clusters 302. For example, the policy importer 304 may receive data about new insurance policies and/or existing insurance policies that are being migrated from a legacy system or other source. The policy importer 304 may assign insurance policies to be managed by elements of the first cluster 302A, elements of the second cluster 302B, or by elements of any other cluster. For example, when a batch of insurance policies is migrated to the policy management system from a legacy system, the policy importer 304 may be configured to assign the insurance policies in the batch among a set of available clusters as part of the migration process.

In some examples, the policy importer 304 may perform load balancing operations when assigning insurance policies to the clusters 302. For example, the policy importer 304 may be provided with information about the first database 206A, the second database 206B, and databases in other clusters 302, such as how many records are currently stored in each database, a capacity of each database, available memory in each database, and/or other attributes of each database. If the policy importer 304 determines that one database is fuller than another database, the policy importer 304 may assign a new insurance policy to the less-full database to balance the loads of the databases in different clusters 302. In other examples, the policy importer 304 may be configured to assign insurance policies to clusters 302 randomly, in a round-robin or other predefined order, or in any other order.

In example 300, the policy importer 304 may be configured to assign insurance policies to clusters 302 without determining if different insurance policies are related. Accordingly, in example 300, the policy importer 304 may assign related insurance policies to different clusters 302. As an example, although a first policy 306 and a second policy 308 may have the same client identifier and match a predefined set of other attributes, such that the insurance policies could be considered to be a target policy and a source policy that could be consolidated, the policy importer 304 may assign the first policy 306 to the first cluster 302A and assign the second policy 308 to the second cluster 302B. Accordingly, if an instance of the policy consolidator 102 exists within the first cluster 302A and has access to the first database 206A, that instance of the policy consolidator 102 may not have access to the second database 206B in the second cluster 302B, and thus may not be able to determine that the first policy 306 and the second policy 308 should be consolidated.

However, an instance of the policy consolidator 102 may exist at a cross-cluster service 310 that executes separately from and/or outside the clusters 302. The policy consolidator 102 at the cross-cluster service 310 service may have access to the databases in multiple clusters 302, and/or may interface with instances of the online policy manager 202 and the batch policy manager 204 in multiple clusters 302. For example, the cross-cluster service 310 may execute at a separate server or computing device that is different from the computing elements associated with the clusters 302, but be in data communication with the computing elements associated with the clusters 302.

The policy consolidator 102 at the cross-cluster service 310 may access and evaluate policy data in databases of any of the clusters 302. Accordingly, the policy consolidator 102 at the cross-cluster service 310 can evaluate whether policy data held in the same cluster, and/or different clusters 302, are associated with a source policy and a target policy that can be consolidated.

As an example, the policy consolidator 102 at the cross-cluster service 310 can process the second policy 308 in response to a trigger event associated with the second policy 308. The trigger event may be an import of the second policy 308 into the second cluster 302B, an upcoming renewal of the second policy 308, a consolidation instruction associated with the second policy 308 that is received from a user via the second online policy manager 202B, or any other type of trigger event. The policy consolidator 102 can identify a client identifier associated with the second policy 308 from data in the second database 206B, and can search for other insurance policies that are also associated with that client identifier in the first database 206A in the first cluster 302A, in the second database 206B in the second cluster 302B, and/or other databases of other clusters 302.

In this example, the policy consolidator 102 at the cross-cluster service 310 can determine that policy data for the first policy 306, stored in the first database 206A of the first cluster 302A, indicates the same client identifier as the policy data for the second policy 308 in the second database 206B of the second cluster 302B. The policy consolidator 102 at the cross-cluster service 310 can further determine that a predefined set of other attributes match between the first policy 306 and the second policy 308. Accordingly, the policy consolidator 102 at the cross-cluster service 310 can determine that the second policy 308 is a source policy, that the first policy 306 is a target policy, and that data of the second policy 308 should be consolidated into the first policy 306.

The policy consolidator 102 at the cross-cluster service 310 can therefore add at least some policy data associated with the second policy 308 from the second database 206B into a record for the first policy 306 in the first database 206A. Accordingly, policy data of the second policy 308 can become stored in a record of the first policy 306, such that the first policy 306 and the second policy 308 become consolidated to cover vehicles or other elements that were previously covered separately by the first policy 306 and the second policy 308.

In some examples, the data copied from the second policy 308 can become associated with the policy number and/or or the term of the first policy 306. As such, vehicles or other elements previously insured separately with respect to the first policy 306 and the second policy 308 can become associated with the same policy number, and can become associated with the same term and/or renewal dates. In some examples, the policy consolidator 102 may maintain a record of the second policy 308 in the second database 206B, but edit that record to indicate that the second policy 308 should not be renewed on its own.

In other examples, the policy consolidator 102 at the cross-cluster service 310 may edit the record of the first policy 306 in the first database 206A, and/or edit the record of the second policy 308 in the second database 206B, to link the two policy records in the different databases. In this example, policy data of the second policy 308 may be maintained at the second database 206B, but the second policy 308 may become associated with the policy number and/or term of the first policy 306. The link between the records of the first policy 306 and the second policy 308 may give permission for elements in the first cluster 302A to access data about the second policy 308 in the second database 206B of the second cluster 302B in association with the first policy 306, such that the two insurance policies can be managed together by the first online policy manager 202A or the first batch policy manager 204A.

In some examples, the predefined set of attributes that the policy consolidator 102 evaluates when comparing two insurance policies based on records stored in the same database 206, or databases 206 in different clusters 302, can be stored and configured in memory associated with the cross-cluster service 310. Accordingly, changes to the predefined set of attributes at the cross-cluster service 310 can be applied and by the policy consolidator 102 with respect to all of the clusters 302, rather than separately configuring instances of the policy consolidator 102 within each of the clusters 302.

Overall, by executing the policy consolidator 102 at the cross-cluster service 310, the policy consolidator 102 can access information about insurance policies stored in databases of multiple clusters 302. Accordingly, the policy consolidator 102 executing at the cross-cluster service 310 can consolidate related insurance policies even if information associated with the related insurance policies are initially stored in different clusters 302.

Figure 4:
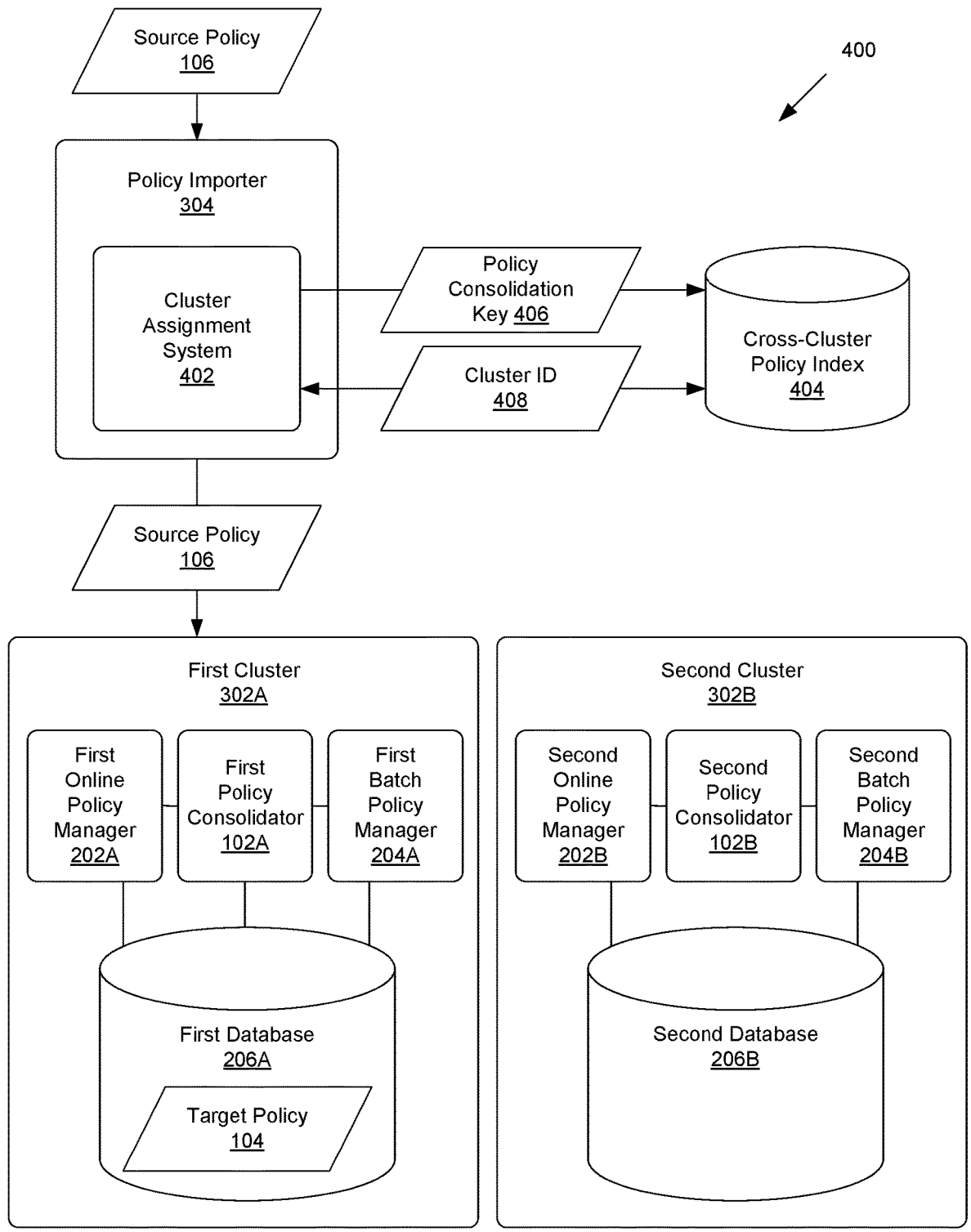
FIG. 4 shows a third example of a policy management system that is associated with different clusters.

FIG. 4 shows a third example 400 of a policy management system that is associated with different clusters 302. Different clusters 302 may represent different instances of the policy management system discussed above with respect to FIG. 2, and may be associated with, and/or be executed by, different servers or other computing elements as discussed above with respect to FIG. 3. Each cluster can also include one or more instances of the online policy manager 202, one or more instances of the batch policy manager 204, and/or one or more databases. Different clusters 302 may have different databases that store records for different sets of insurance policies, as discussed above with respect to FIG. 3.

In some examples, different clusters 302 can also include different instances of the policy consolidator 102. For example, the first cluster 302A may include a first policy consolidator 102A that has access to a first set of insurance policy records stored the first database 206A, while the second cluster 302B may include a second policy consolidator 102B that has access to a second set of insurance policy records stored the second database 206B. In this example, the first policy consolidator 102A may not have direct access to the second set of insurance policy records stored the second database 206B. However, in other examples, the policy consolidator 102 may execute outside the clusters 302 at the cross-cluster service 310, and thereby have access to records stored in databases of any or all of the clusters 302, as discussed above with respect to FIG. 3.

In example 400, the policy importer 304 can include a cluster assignment system 402 that is configured to assign related insurance policies to the same cluster when the insurance policies are migrated or imported into the policy management system. Accordingly, because the cluster assignment system 402 can cause records for a target policy and a source policy to initially be stored in the same cluster, the instance of the policy consolidator 102 associated with that cluster, or an instance of the policy consolidator 102 executing at the cross-cluster service 310, can consolidate the insurance policies within that cluster without copying policy data from one cluster to another cluster.

The cluster assignment system 402 can be associated with a cross-cluster policy index 404. The cross-cluster policy index 404 may be stored at the cross-cluster service 310, or any other server or computing device. The cross-cluster policy index 404 can be a database or other repository that stores information about insurance policies that have already been imported or migrated into the policy management system, and are associated with records stored in databases of the clusters 302. The cross-cluster policy index 404 can maintain mapping data, key-value pairs, or other information that associates policy consolidation keys of insurance policies with corresponding cluster identifiers that uniquely identify the clusters 302 that store records of the insurance policies. For example, an insurance policy can be associated with a policy consolidation key 406, and mapping information in the cross-cluster policy index 404 can associate the policy consolidation key 406 of the insurance policy with a cluster identifier 408 that identifies the particular cluster that stores a record of the insurance policy.

The policy consolidation key 406 of an insurance policy may be associated with a client identifier of the insurance policy. For example, the policy consolidation key 406 of an insurance policy can be, or can be derived from, a client identifier such as a name, a number, a string of alphanumeric characters, or any other data that uniquely identifies the insured party associated with the insurance policy. Because multiple insurance policies may be associated with the same insured party as described herein, multiple insurance policies may be associated with the same policy consolidation key.

Accordingly, during a migration or import process for an input insurance policy, the cluster assignment system 402 of the policy importer 304 can determine the policy consolidation key 406 associated with the input insurance policy. The cluster assignment system 402 can make a call to the cross-cluster policy index 404 that identifies the policy consolidation key 406 associated with the input insurance policy. If the cross-cluster policy index 404 determines that another insurance policy, already represented by a record stored in a database of a cluster, is also associated with the policy consolidation key 406 associated with the input insurance policy, the cross-cluster policy index 404 can return the cluster identifier 408 associated with the policy consolidation key 406 to the cluster assignment system 402. The cluster assignment system 402 can accordingly cause the policy importer 304 to assign the input insurance policy to the cluster identified by the returned cluster identifier 408, which already stores one or more records of other insurance policies associated with the same insured party as the input insurance policy. Because the cluster assignment system 402 can cause records for multiple insurance policies associated with the same insured party to be stored in the same cluster, an instance of the policy consolidator 102 can identify such records stored in the cluster without accessing databases of other clusters, determine whether the insurance policies associated with the cluster include a target policy and a source policy that can be consolidated, and if so consolidate the insurance policies without copying policy data from one cluster to another cluster.

For example, the target policy 104 and the source policy 106 discussed above can be associated with the same insured party name, and can thus both be associated with the same policy consolidation key 406. The target policy 104 may have previously been imported into the policy management system, and a record for the target policy 104 may be stored in the first database 206A of the first cluster 302A as shown in FIG. 4. The cross-cluster policy index 404 can also store information indicating that the record for the target policy 104 is stored in the first cluster 302A. In this example, if the source policy 106 is later imported into the policy management system, the cluster assignment system 402 can provide the policy consolidation key 406 associated with the source policy 106 to the cross-cluster policy index 404, and the cross-cluster policy index 404 can return the cluster identifier 408 of the first cluster 302A because the previously-imported target policy 104 is associated with the same policy consolidation key 406 and is already associated with the first cluster 302A. Based on the cluster identifier 408 of the first cluster 302A, the cluster assignment system 402 can cause information associated with the source policy 106 to be stored in the first database 206A of the first cluster 302A.

The first policy consolidator 102A, or a policy consolidator executing at the cross-cluster service 310 that has access to the records stored in the first database 206A, can accordingly determine from the records of the source policy 106 and the target policy 104 stored in the first database 206A that the source policy 106 should be consolidated into the target policy 104. For instance, upon the occurrence of a trigger event, such as an upcoming renewal of the source policy 106, the first policy consolidator 102A can consolidate the source policy 106 into the target policy 104 as described above with respect to FIG. 1, such that the record of the target policy 104 stored in the first database 206A is changed to represent the insurance coverage previously represented separately by the source policy 106 and the target policy 104. Accordingly, because the cluster assignment system 402 caused records for both the target policy 104 and the source policy 106 to be stored in the first cluster 302A initially upon import of the insurance policies, the source policy 106 can be consolidated into the target policy 104 without transferring data from the second cluster 302B to the first cluster 302A.

If the cluster assignment system 402 provides the policy consolidation key 406 of an input insurance policy to the cross-cluster policy index 404, but the cross-cluster policy index 404 does not indicate that records of any other insurance policies associated with the policy consolidation key 406 are stored in any of the clusters 302, the cluster assignment system 402 may select any of the clusters 302 for the input insurance policy at random, based on a round-robin or other predefined order, based on load balancing operations, or in any other way as discussed above with respect to FIG. 3. The cluster assignment system 402 can assign the input insurance policy to the selected cluster, and can also cause the cross-cluster policy index 404 to associate the policy consolidation key 406 of the input insurance policy with the selected cluster. Accordingly, if another insurance policy is received at a later point in time that is associated with the same policy consolidation key 406, the cluster assignment system 402 can use the cross-cluster policy index 404 to determine which cluster is already associated with the policy consolidation key 406 as described above.

Figure 5:
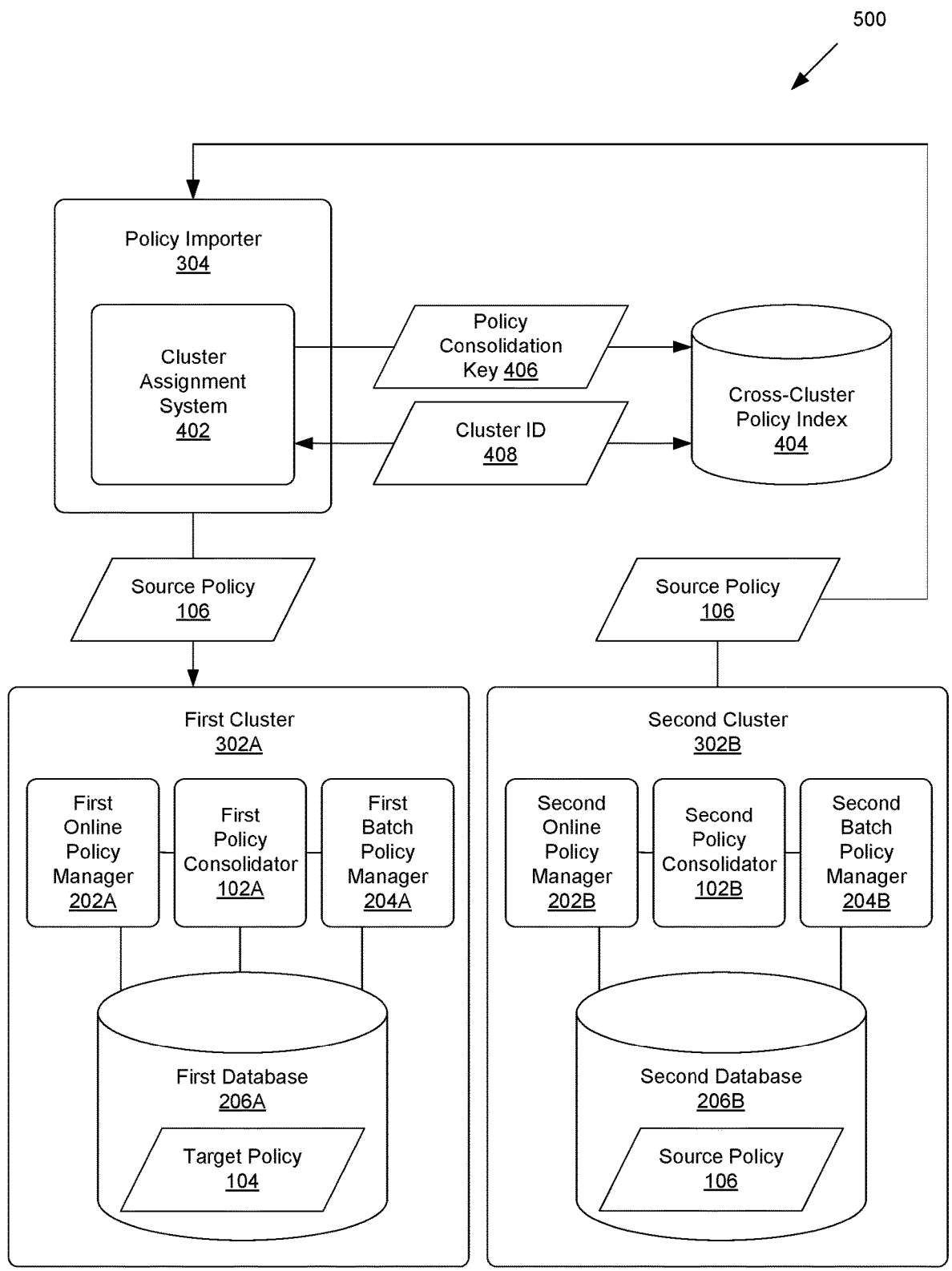
FIG. 5 shows an example in which a cluster assignment system may initially assign related insurance policies to different clusters, but can perform a re-migration process to assign the related insurance policies to the same cluster.

FIG. 5 shows an example 500 in which the cluster assignment system 402 shown in FIG. 4 may initially assign related insurance policies to different clusters 302, but can later perform a re-migration process to assign the related insurance policies to the same cluster. As discussed above with respect to FIG. 4, the cluster assignment system 402 can be configured to determine the policy consolidation key 406 of an input insurance policy based on a client identifier of the input insurance policy. If the cross-cluster policy index 404 indicates that the policy consolidation key 406 is already associated with a cluster and returns the corresponding cluster identifier 408, the cluster assignment system 402 can assign the input insurance policy to the identified cluster as discussed above with respect to FIG. 4. Accordingly, if different insurance policies are associated with the same policy consolidation key when the insurance policies are imported or migrated into the policy management system, the cluster assignment system 402 can assign the insurance policies to the same cluster. However, if related insurance policies are associated with different policy consolidation keys when the insurance policies are imported or migrated into the policy management system, the cluster assignment system 402 may initially assign the insurance policies to different clusters 302.

For example, if the target policy 104 and the source policy 106 shown in FIG. 5 were associated with different insured party names when the target policy 104 and the source policy 106 were initially migrated to the policy management system, the cluster assignment system 402 may have determined that the target policy 104 and the source policy 106 had different policy consolidation keys. The cluster assignment system 402 may have assigned the target policy 104 and the source policy 106 to different clusters 302 due to the different policy consolidation keys associated with the insurance policies.

For example, records for the target policy 104 and the source policy 106 may have indicated different insured party names when the insurance policies were migrated to the policy management system due to typographical errors, different name orders, or any other reason. The different insured party names associated with the target policy 104 and the source policy 106 may have caused the cluster assignment system 402 to determine that the insurance policies were associated with different policy consolidation keys. Accordingly, because the policy consolidation keys did not match upon initial migration of the target policy 104 and the source policy 106 into the policy management system, the cluster assignment system 402 may have caused a record for the target policy 104 to be stored in the first database 206A of the first cluster 302A, and may have caused a record for the source policy 106 to be stored in the second database 206B of the second cluster 302B, as shown in FIG. 5.

However, after initial import of the target policy 104 and the source policy 106 into the clusters 302, the insured party name associated with one of the target policy 104 and the source policy 106 may be edited such that the target policy 104 and the source policy 106 become associated with the same insured party name. Accordingly, the change to the insured party name of one of the target policy 104 and the source policy 106 may cause the target policy 104 and the source policy 106 to become associated with the same policy consolidation key 406.

If a change to one of the target policy 104 or the source policy 106 causes the target policy 104 and the source policy 106 to become associated with the same policy consolidation key 406, the record of the source policy 106 can be removed from the second cluster 302B and be provided to the policy importer 304 again to initiate a re-migration of the source policy 106. Because the changes have caused the target policy 104 and the source policy 106 to become associated with the same policy consolidation key 406, the cross-cluster policy index 404 can return the cluster identifier 408 of the first cluster 302A during the re-migration of the source policy 106 because a record for the target policy 104, also associated with the policy consolidation key 406, is stored in the first cluster 302A. Accordingly, the cluster assignment system 402 can cause the record for the source policy 106, previously stored in the second cluster 302B, to be re-migrated into the first cluster 302A. Accordingly, when policy consolidation conditions are met, the source policy 106 can be consolidated into the target policy 104 within the first cluster 302A.

In some examples, an element of a cluster that assists with changing the insured party name associated with one of the target policy 104 or the source policy 106 may notify the cluster assignment system 402 of the change and thereby initiate a re-migration of the source policy 106. For example, if a user uses the second online policy manager 202B to change the insured party name associated with the source policy 106, the second online policy manager 202B may notify the cluster assignment system 402 that the policy consolidation key 406 associated with the source policy 106 may have changed. Such a notification may cause the cluster assignment system 402, and/or an element of the cross-cluster service 310, to access records of the target policy 104 and the source policy 106 in the clusters 302 to re-determine the policy consolidation keys of the insurance policies and determine whether the policy consolidation keys match such that a re-migration of the source policy 106 should be initiated. In other examples, the cluster assignment system 402, another element of the policy importer 304, an element of the cross-cluster service 310, or any other element of the policy management system may be configured to detect changes to records of insurance policies stored in the clusters 302, and to determine whether a re-migration of the source policy 106 should be initiated based on such changes.

In some examples, a change to the source policy 106 can initiate the re-migration of the source policy 106. For instance, changing the name of the insured party associated with the source policy 106 to match the name of the insured party associated with the target policy 104 can cause the target policy 104 and the source policy 106 become associated with the same policy consolidation key 406 and thereby initiate a re-migration of a record of the source policy 106 from one cluster into another cluster that stores a record of the target policy 104. In other examples, a change to the target policy 104 can initiate the re-migration of the source policy 106. For instance, changing the name of the insured party associated with the target policy 104 to match the name of the insured party associated with the source policy 106 can cause the target policy 104 and the source policy 106 become associated with the same policy consolidation key 406 and thereby initiate a re-migration of a record of the source policy 106 from one cluster into another cluster that stores a record of the target policy 104. In either example, the target policy 104 may already be bound due to a previous initiation of a renewal process associated with the target policy 104, while the source policy 106 may be unbound because a renewal process associated with the source policy 106 has not yet begun. Accordingly, regardless of whether the insured party name associated with the target policy 104 or the source policy 106 was changed to cause both insurance policies to be associated with the same insured party name, the change can cause the record of the unbound source policy 106 to be re-migrated into the cluster associated with the bound target policy 104. Accordingly, the target policy 104 and the source policy 106 can be consolidated after the re-migration of the record of the source policy 106 without moving the record of the already-bound target policy 104.

Overall, the cluster assignment system 402 shown in FIG. 4 and FIG. 5 can cause records of related insurance policies to be migrated or re-migrated into the same cluster. Accordingly, because records of related insurance policies can be stored in the same cluster, an instance of the policy consolidator 102 associated with the cluster, or the cross-cluster service 310, can consolidate the related insurance policies without copying policy data from one cluster to another cluster during the consolidation process.

Figure 6:
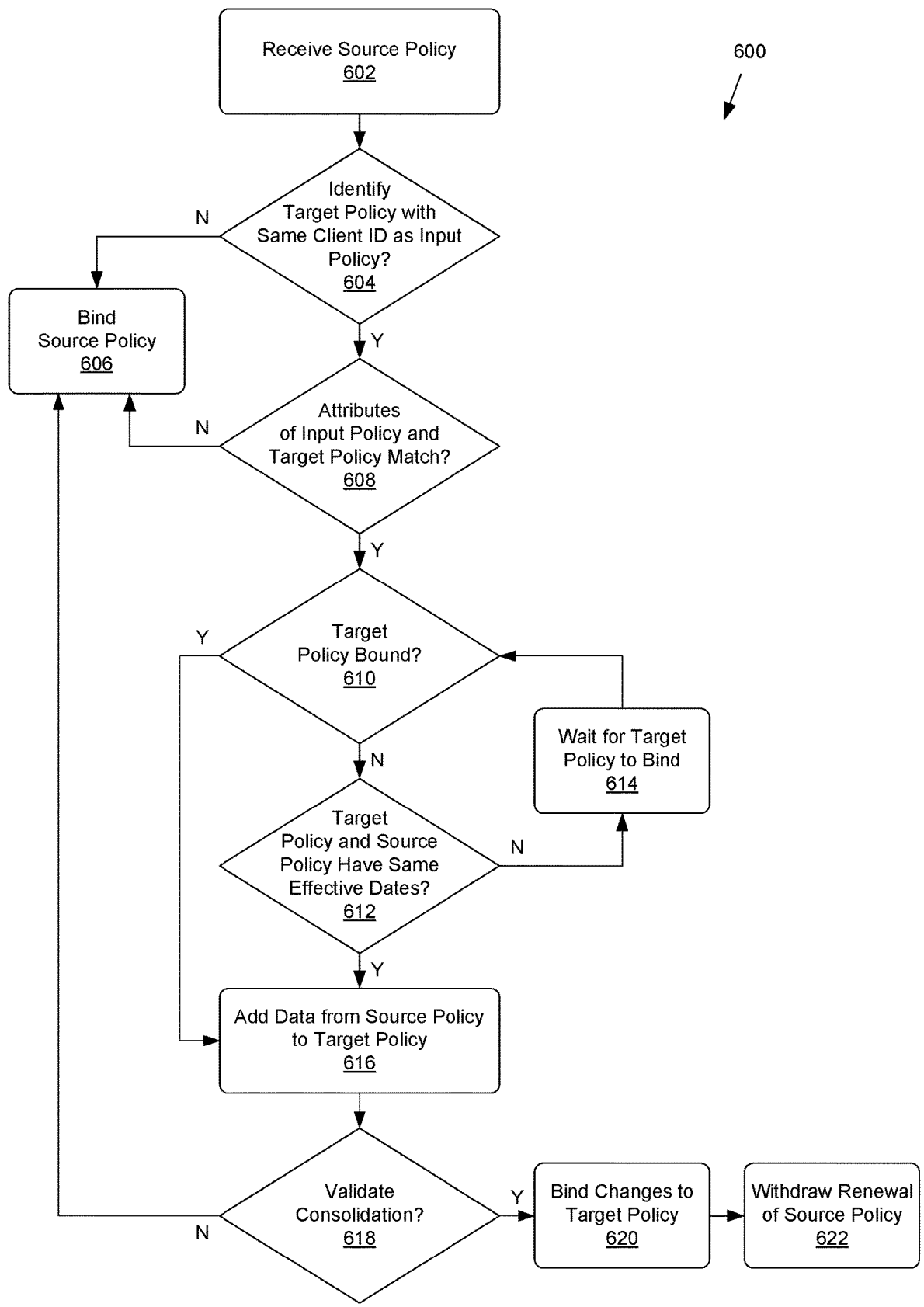
FIG. 6 shows a flowchart of an example method the policy consolidator can use to consolidate insurance policies.

FIG. 6 shows a flowchart of an example method 600 the policy consolidator 102 can use to consolidate insurance policies. In some examples, the policy consolidator 102 can access policy data for a single set of insurance policies stored in a single database, or mirrored instances of the same database, as shown in FIG. 2. In other examples, the policy consolidator 102 can be positioned at the cross-cluster service 310 and can access policy data for multiple sets of insurance policies that are stored in databases of different clusters 302, as shown in FIG. 3. In still other examples, different clusters 302 can have different policy consolidators as shown in FIGS. 4 and 5, and the policy consolidator that executes method 600 can be associated with one of the clusters 302.

At block 602, the policy consolidator 102 can receive policy data of a source policy. In some examples, the policy consolidator 102 can receive the policy data of the source policy in response to the occurrence of a trigger condition, such as if the source policy is being newly migrated to the policy management system from another source, and/or if the source policy is due for renewal within a predetermined period of time.

At block 604, the policy consolidator 102 can attempt to identify a target policy with the same client identifier as the source policy. In examples in which the policy consolidator 102 is linked to a single database as shown in FIG. 2 or FIGS. 4 and 5, the policy consolidator 102 may evaluate policy data in that database when attempting to identify a target policy with the same client identifier as the source policy. In other examples in which the policy consolidator 102 is positioned at the cross-cluster service 310 as shown in FIG. 3, the policy consolidator 102 may evaluate policy data in databases of one or more clusters 302 when attempting to identify a target policy with the same client identifier as the source policy. For instance, if the source policy is the second policy 308 shown in FIG. 3, the policy consolidator 102 can search for policy records associated with the same client identifier as the second policy 308 in the first database 206A in the first cluster 302A, in the second database 206B in the second cluster 302B, and/or in other databases of other clusters 302.

If the policy consolidator 102 is unable to identify a target policy that is associated with the same client identifier as the source policy at block 604 (Block 604-No), the policy consolidator 102 may cause the policy management system to bind the source policy at block 606, and the process can end. For example, the policy management system may process the renewal of the source policy alone at block 606, without consolidating the source policy with any other insurance policies. This can cause the source policy to obtain a "bound" status in the policy management system.

However, if the policy consolidator 102 identifies a target policy that is associated with the same client identifier as the source policy at block 604 (Block 604-Yes), the policy consolidator 102 can also determine whether a predetermined set of other attributes match between the source policy and the target policy at block 608. For example, at block 608 the policy consolidator 102 can determine whether records for the target policy and the source policy indicate the same named insured party, the same mutual or standard insurance company, the same insurance agent, the same residential or garage address, the same mandatory coverages, the same vehicle use information, the same guaranteed renewal status, the same term length, renewal dates that are not less than 10 days (or any other threshold time period) apart, the same driver exclusions, and the same billing method and/or billing account.

If the policy consolidator 102 determines at block 608 that the predetermined set of other attributes do not match between the source policy and the target policy (Block 608-No), despite the two insurance policies being associated with the same client identifier, the policy consolidator 102 may cause the policy management system to bind the source policy alone at block 606, without consolidating the source policy into the target policy. For example, although the source policy and the target policy may be associated with the same insured party, the two insurance policies may have different term lengths, be associated with different insurance agents, be associated with different addresses, or otherwise have differing attributes that may prevent consolidation or indicate that the insurance policies should be managed separately.

If the policy consolidator 102 instead determines at block 608 that the predetermined set of other attributes do match between the source policy and the target policy (Block 608-Yes), the policy consolidator 102 can conclude that the source policy can be consolidated into the target policy. The process can therefore continue at block 610.

At block 610, the policy consolidator 102 can determine whether the target policy is already bound in the policy management system. As discussed above, in some examples the policy management system can bind an insurance policy when the insurance policy has been migrated into the policy management system, and/or when a renewal process for the insurance policy has begun following the migration. Accordingly, at block 610, the policy consolidator 102 can determine if the identified target policy has a "bound" status within the policy management system, for instance if the target policy has already been migrated and renewed via the policy management system, or if renewal notices have already been sent with respect to an upcoming renewal of the target policy.

If the target policy is not yet bound (Block 610-No), the policy consolidator 102 can determine at block 612 whether the source policy and the target policy have the same effective dates, such as the dates of respective terms of the source policy and the target policy. In some examples, if the source policy and the target policy do not have the same effective dates (Block 612-No), such as if the term of the source policy is scheduled to end later than the term of the target policy, the policy consolidator 102 may wait at block 614 for a renewal process for the target policy to begin and for the target policy to be bound. The policy consolidator 102 can then determine at block 610 that the target policy is bound (Block 610-Yes), after waiting at block 614.

If the policy consolidator 102 determines that the target policy is already bound at block 610 (Block 610-Yes), or that the target policy is not yet bound but has the same effective dates as the source policy at block 612 such that the insurance policies would renew at the same time (Block 612-Yes), the policy consolidator 102 can begin consolidating the source policy into the target policy at block 616. For instance, if the source policy and the target policy have the same effective dates, the source policy can be consolidated into the target policy such that the insurance coverage represented by both insurance policies can be renewed in association with the target policy at the same time following the consolidation.

At block 616, the policy consolidator 102 can add at least some source policy data 110 from a record of the source policy into a record of the target policy, as described above. In some examples, the term and/or policy number of the target policy may apply to both the original target policy data 108 associated with the target policy and the newly copied source policy data 110, such that insurance coverage previously represented by the source policy and the target policy becomes associated with the same policy number and term dates.

In some examples, the record of the target policy and the record of the source policy may exist in the same database, and the policy consolidator 102 may copy data between the records in the same database. For example, the policy consolidator 102 can be associated with a single database that holds records for a set of insurance policies as shown in FIG. 2, or can be associated with a database of a particular cluster that stores records for a different set of insurance policies than one or more other clusters 302 as shown in FIGS. 4 and 5. However, in other examples, the record of the target policy and the record of the source policy may exist in different databases associated with different clusters 302, and the policy consolidator 102 may be located at the cross-cluster service 310 such that the policy consolidator 102 can copy data between the records in different databases of different clusters 302 as shown in FIG. 3.

At block 618, the policy consolidator 102 can attempt to validate the consolidation. For example, the policy consolidator 102 and/or other elements of the policy management system can perform automated data validation processes and/or underwriting processes to verify that data associated with the source policy and the target policy have been consolidated, and/or that data errors have not occurred during the consolidation. For instance, in some examples, a new insurance quote may be generated based on the changes made to the target policy to incorporate elements of the source policy. In some instances, the data validation processes and/or underwriting processes may output an error or a flag indicating that the consolidation has failed, or that the consolidation should be manually reviewed. In such instances, the policy consolidator 102 or other elements of the policy management system can flag the consolidation for manual review via an instance of the online policy manager 202 or another user interface, which may allow a user to fix any issues that may otherwise prevent the consolidation. Once such corrective user input has been received, which may further edit the record for the target policy, the automated data validation processes and/or underwriting processes may be repeated to verify and/or validate the consolidation of the insurance policies. In some examples, if the validation fails and/or if a user does not fix the issues preventing consolidation (Block 618-No), the policy consolidator 102 may deny the consolidation, restore the original records of the target policy and/or the source policy, and cause the source policy to bind on its own at block 606.

However, if data from the source policy is successfully added into the record for the target policy and the validation is successful at block 618 (Block 618-Yes), the policy consolidator 102 can bind the changes to the target policy at block 620. If the target policy had not previously been bound prior to the consolidation, the policy management system can proceed with renewal operations with respect to the target policy in order to bind the target policy, which can now represent consolidated insurance coverage. If the target policy had previously been bound, the changes made at block 616 can be saved to bind the changes.

At block 622, the policy consolidator 102 can withdraw renewal of the source policy following successful consolidation of the source policy data 110 into the target policy. For example, due to the consolidation, the insurance coverage previously represented separately by the target policy and the source policy can be represented together via the target policy. Accordingly, the consolidated insurance coverage can renew together in the future, such that a separate renewal of the source policy alone can be avoided. In some examples, the policy consolidator 102 can withdraw renewal of the source policy at block 622 by placing the record of the source policy into a draft status, or otherwise flagging the record as incomplete or not to be renewed. This flag or change in status can prevent the source policy from binding or renewing on its own when the original termination date of the source policy is reached.

Figure 7:
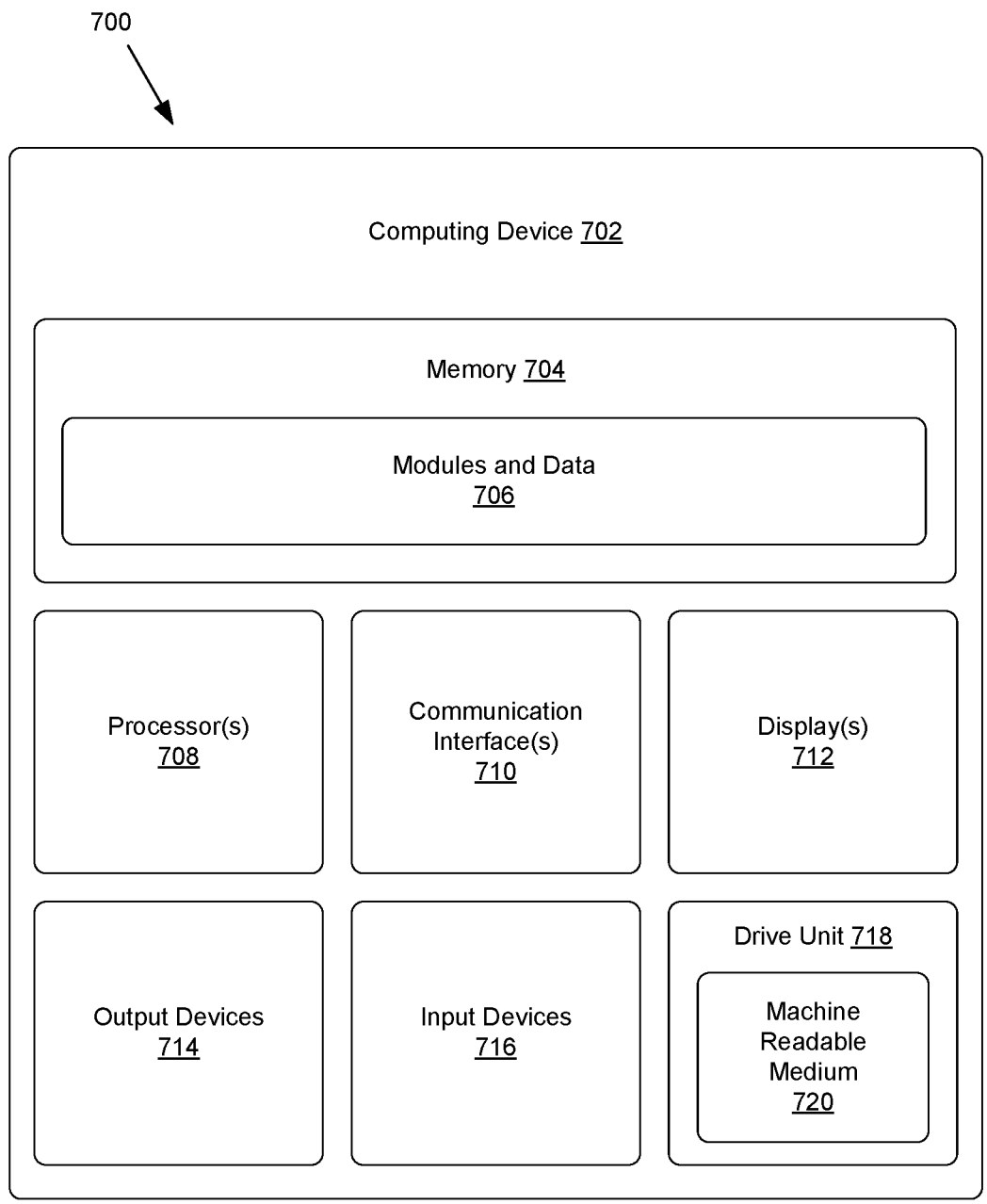
FIG. 7 shows an example system architecture for a computing device associated with the policy consolidator.

FIG. 7 shows an example system architecture 700 for a computing device 702 associated with the policy consolidator 102 described herein. The computing device 702 can be a server, computer, or other type of computing device that executes the policy consolidator 102. In some examples, the computing device 702 can be perform the method 600 described above with respect to FIG. 6, for example by executing a policy consolidator that has access to the database 206 as shown in FIG. 2, a policy consolidator that executes at the cross-cluster service 310 as shown in FIG. 3, or a policy consolidator that executes with respect to a particular cluster as shown in FIGS. 4 and 5. In some examples, the computing device 702 may also execute one or more other elements of a policy management system associated with the policy consolidator 102, such as the online policy manager 202, the batch policy manager 204, the policy importer 304, the cross-cluster service 310, the cluster assignment system 402, and/or the cross-cluster policy index 404.

The computing device 702 can include memory 704. In various examples, the memory 704 can include system memory, which may be volatile (such as RAM), nonvolatile (such as ROM, flash memory, etc.) or some combination of the two. The memory 704 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 702. Any such non-transitory computer-readable media may be part of the computing device 702.

The memory 704 can store modules and data 706. The modules and data 706 can include data associated with the policy consolidator 102, such as a predefined set of attributes used by the policy consolidator 102 to determine if two insurance policies qualify as the target policy 104 and the source policy 106, computer-readable instructions associated with operations of the policy consolidator 102, and/or other data. The modules and data 706 can also include any other modules and/or data that can be utilized by the computing device 702 to perform or enable performing any action taken by the policy consolidator 102. Such other modules and data can include a platform, operating system, and applications, and data utilized by the platform, operating system, and applications.

The computing device 702 can also have processor(s) 708, communication interfaces 710, displays 712, output devices 714, input devices 716, and/or a drive unit 718 including a machine readable medium 720.

In various examples, the processor(s) 708 can be a central processing unit (CPU), a graphics processing unit (GPU), both a CPU and a GPU, or any other type of processing unit. Each of the one or more processor(s) 708 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 708 may also be responsible for executing computer applications stored in the memory 704, which can be associated with common types of volatile (RAM) and/or nonvolatile (ROM) memory.

The communication interfaces 710 can include transceivers, modems, interfaces, antennas, telephone connections, and/or other components that can transmit and/or receive data over networks, telephone lines, or other connections.

The display 712 can be a liquid crystal display or any other type of display commonly used in computing devices. For example, the display 712 may be a touch-sensitive display screen, and can then also act as an input device or keypad, such as for providing a soft-key keyboard, navigation buttons, or any other type of input.

The output devices 714 can include any sort of output devices known in the art, such as the display 712, speakers, a vibrating mechanism, and/or a tactile feedback mechanism. Output devices 714 can also include ports for one or more peripheral devices, such as headphones, peripheral speakers, and/or a peripheral display.

The input devices 716 can include any sort of input devices known in the art. For example, input devices 716 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 720 can store one or more sets of instructions, such as software or firmware, that embodies any one or more of the methodologies or functions described herein. The instructions can also reside, completely or at least partially, within the memory 704, processor(s) 708, and/or communication interface(s) 710 during execution thereof by the computing device 702. The memory 704 and the processor(s) 708 also can constitute machine readable media 720.

As described herein, insurance policy consolidation by the policy consolidator 102 can simplify management and communication regarding insurance for related elements. For example, although separate insurance policies for two different cars may have terms that are set to expire at different times, consolidating the insurance policies into a single insurance policy can cause the insurance for both cars to have the same terms and the same renewal periods going forward. Accordingly, consolidating the insurance policies together can allow a policy management system to process a single renewal of the consolidated insurance policies, and thereby reduce processing cycles, memory usage, and bandwidth usage relative to processing renewals of the insurance policies separately. As another example, information about the insurance for both cars can be provided to an insured party together in a notification following the consolidation, rather than being sent separately in association with different insurance policies. This can reduce confusion for the insured party, and also reduce the amount of bandwidth and other computing resources used to generate and send such notifications. As yet another example, information about the insurance for both cars can be stored in a single digital record in a database, instead of in separate digital records, which can simplify data storage processes, reduce amounts of memory used to store digital records of insurance policies, and otherwise allow digital records of insurance policies to be managed more efficiently and/or with fewer amounts of computing resources.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A multi-cluster policy consolidation system, comprising:
a policy importer configured to assign database records among a plurality of disconnected clusters, wherein the database records are associated with at least one of new insurance policies or existing insurance policies being migrated from a legacy system;
a first cluster, of the plurality of disconnected clusters, comprising a first database and a first policy management system, wherein:
the first database stores a first set of database records associated with first insurance policies, and
the first policy management system is configured to perform policy management operations based on the first set of database records;
a second cluster, of the plurality of disconnected clusters, that is disconnected from the first cluster and that comprises a second database and a second policy management system, wherein:
the second database stores a second set of database records associated with second insurance policies,
the second policy management system is configured to perform the policy management operations based on the second set of database records, and
the first set of database records, stored in the first database of the first cluster that is disconnected from the second cluster, is inaccessible by the second policy management system of the second cluster; and
a policy consolidator, associated with the first cluster and the second cluster, configured to perform operations comprising:
identifying, in the first database of the first cluster, a first database record corresponding to a target policy representative of a first insurance coverage, wherein the policy importer initially assigned the first database record to the first cluster;
identifying, in the second database of the second cluster, a second database record corresponding to a source policy representative of a second insurance coverage, wherein the policy importer initially assigned the second database record to the second cluster;
determining that the first database record and the second database record are both characterized by a shared set of attributes; and
consolidating, based on determining that the first database record and the second database record are both characterized by the shared set of attributes, a set of policy data from the second database record into the first database record by:
adding the set of policy data, from the second database record in the second cluster, to the first database record in the first cluster; and
changing a renewal indicator of the second database record in the second cluster, wherein the second database record is maintained in the second cluster following the changing of the renewal indicator, wherein, prior to the consolidating, the first policy management system and the second policy management system are configured, based on the first cluster and the second cluster being disconnected, to respectively perform renewal operations at different times to separately renew;

the first insurance coverage based on the first database record in the first cluster, and the second insurance coverage based on the second database record in the second cluster, and wherein the consolidating causes:

the first database record, in the first database of the first cluster, to represent both the first insurance coverage and the second insurance coverage, withdrawal of a pending future renewal of the source policy, by the second policy management system, based on the changing of the renewal indicator of the second database record in the second cluster, and the first policy management system to perform the renewal operations to renew the first insurance coverage and the second insurance coverage together at a same time based on the first database record in the first cluster.

2. The multi-cluster policy consolidation system of claim 1, wherein the policy consolidator:

executes at a cross-cluster service outside the first cluster and the second cluster, and has access to the first database of the first cluster and the second database of the second cluster.

3. The multi-cluster policy consolidation system of claim 1, wherein:

the operations performed by the policy consolidator further comprise detecting an occurrence of a trigger event associated with the source policy, and the policy consolidator performs the identifying of the first database record and the second database record, the determining that the first database record and the second database record are both characterized by the shared set of attributes, and the consolidating of the set of policy data from the second database record into the first database record in response to detecting the occurrence of the trigger event.

4. The multi-cluster policy consolidation system of claim 1, wherein the shared set of attributes includes a client identifier.

5. The multi-cluster policy consolidation system of claim 4, wherein the shared set of attributes further includes one or more of:

a named insured party,
an insurance company,
an insurance agent,
an address,
one or more mandatory coverages,
vehicle use information,
a guaranteed renewal status,
a term length,
one or more driver exclusions, and
billing information.

6. A computer-implemented method, comprising:

assigning, by a policy importer executed by one or more processors, database records among a plurality of disconnected clusters, wherein:

the database records are associated with at least one of new insurance policies or existing insurance policies being migrated from a legacy system, a first cluster, of the plurality of disconnected clusters, comprises a first database and a first policy management system configured to perform policy management operations based on a first set of database records stored in the first database, a second cluster, of the plurality of disconnected clusters, is disconnected from the first cluster and comprises a second database and a second policy management system configured to perform the policy management operations based on a second set of database records stored in the second database, the first set of database records, stored in the first database of the first cluster that is disconnected from the second cluster, is inaccessible by the second policy management system of the second cluster, a first database record, representing a first insurance coverage, is initially assigned to the first cluster by the policy importer, and a second database record, representing a second insurance coverage, is initially assigned to the second cluster by the policy importer;

determining, by a policy consolidator executed by the one or more processors, that the first database record in the first cluster and the second database record in the second cluster are characterized by a set of common attributes; and consolidating, by the policy consolidator, and based on determining that the first database record and the second database record are characterized by the set of common attributes, a set of policy data from the second database record into the first database record by:

adding the set of policy data, from the second database record in the second cluster, to the first database record in the first cluster; and changing a renewal indicator of the second database record in the second cluster, wherein the second database record is maintained in the second cluster following the changing of the renewal indicator, wherein, prior to the consolidating, the first policy management system and the second policy management system are configured, based on the first cluster and the second cluster being disconnected, to respectively perform renewal operations at different times to separately renew:

the first insurance coverage based on the first database record in the first cluster, and the second insurance coverage based on the second database record in the second cluster, and wherein the consolidating causes:

the first database record, in the first database of the first cluster, to represent both the first insurance coverage and the second insurance coverage, withdrawal of a pending future renewal of the second insurance coverage, by the second policy management system, based on the changing of the renewal indicator of the second database record in the second cluster, and the first policy management system to perform the renewal operations to renew the first insurance coverage and the second insurance coverage together at a same time based on the first database record in the first cluster.

7. The computer-implemented method of claim 6, wherein the policy importer is configured to assign the database records among the plurality of disconnected clusters:
  on a random basis, or
  via load balancing operations based on fullness levels of databases of the plurality of disconnected clusters.

8. The computer-implemented method of claim 6, wherein the determining that the first database record and the second database record are characterized by the set of common attributes is based on:
  determining that the first database record and the second database record have a common client identifier; and
  determining that the first database record and the second database record both share a set of additional attributes.

9. The computer-implemented method of claim 8, wherein the set of additional attributes includes one or more of:
  a named insured party,
  an insurance company,
  an insurance agent,
  an address,
  one or more mandatory coverages,
  vehicle use information,
  a guaranteed renewal status,
  a term length,
  one or more driver exclusions, and
  billing information.

10. The computer-implemented method of claim 6, wherein:
  the first database record has a bound status in the first [the] policy management system, due to an initiation of a first renewal process, comprising the renewal operations, associated with the first insurance coverage by the first policy management system, and
  at a time at which the consolidating occurs, the second database record does not have the bound status in the second policy management system, based on the second policy management system not yet having begun a second renewal process, comprising the renewal operations, associated with the pending future renewal.

11. One or more computing devices, comprising:
  one or more processors;
  memory storing computer-executable instructions that, when executed by the one or more processors, cause the one or more processors to perform operations comprising:
    assigning, via a policy importer, database records among a plurality of disconnected clusters, wherein the database records are associated with at least one of new insurance policies or existing insurance policies being migrated from a legacy system;
    identifying, via a policy consolidator, and in a first database of a first cluster of the plurality of disconnected clusters, a first database record corresponding to a target policy representative of a first insurance coverage, wherein:
      the first cluster comprises a first policy management system configured to perform policy operations based on a first set of database records stored in the first database, and
      the first database record was initially assigned to the first cluster by the policy importer;
    identifying, via the policy consolidator, and in a second database of a second cluster of the plurality of disconnected clusters, a second database record corresponding to a source policy representative of a second insurance coverage, wherein:
      the second cluster is disconnected from the first cluster,
      the second cluster comprises a second policy management system configured to perform the policy operations based on a second set of database records stored in the second database,
      the second database record was initially assigned to the second cluster by the policy importer, and
      the first set of database records, stored in the first database of the first cluster that is disconnected from the second cluster, is inaccessible by the second policy management system of the second cluster;
    determining, via the policy consolidator, that the first database record and the second database record are both characterized by a shared set of attributes; and
    consolidating, via the policy consolidator, based on determining that the first database record and the second database record are both characterized by the shared set of attributes, a set of policy data from the second database record into the first database record by:
      adding the set of policy data, from the second database record in the second cluster, to the first database record in the first cluster; and
      changing a renewal indicator of the second database record in the second cluster,
    wherein the second database record is maintained in the second cluster following the changing of the renewal indicator,
  wherein, prior to the consolidating, the first policy management system and the second policy management system are configured, based on the first cluster and the second cluster being disconnected, to respectively perform renewal operations at different times to separately renew:
    the first insurance coverage based on the first database record in the first cluster, and
    the second insurance coverage based on the second database record in the second cluster, and wherein the consolidating causes:
    the first database record to represent, in the first database of the first cluster, both the first insurance coverage and the second insurance coverage,
    withdrawal of a pending future renewal of the source policy, by the second policy management system, based on the changing of the renewal indicator of the second database record in the second cluster, and
    the first policy management system to perform the renewal operations to renew the first insurance coverage and the second insurance coverage together at a same time based on the first database record in the first cluster.

12. The one or more computing devices of claim 11, wherein the shared set of attributes comprises a client identifier and a predefined set of additional attributes.

13. The one or more computing devices of claim 12, wherein the predefined set of additional attributes includes one or more of:
  a named insured party,
  an insurance company,
  an insurance agent,
  an address,
  one or more mandatory coverages,
  vehicle use information, a guaranteed renewal status,
a term length,
one or more driver exclusions, and
billing information.

14. The one or more computing devices of claim 11, wherein the consolidating comprises:
    validating the adding based on at least one of:
        one or more data validation operations to confirm that the adding is successful, or
        one or more underwriting operations to generate a consolidated insurance quote for both the first insurance coverage and the second insurance coverage; and
    changing the renewal indicator of the second database record in response to the validating.

15. The multi-cluster policy consolidation system of claim 3, wherein the trigger event is associated with at least one of:
    an import of the second database record, corresponding to the source policy, into the second cluster by the policy importer,
    the pending future renewal of the source policy, or
    a consolidation instruction associated with the source policy.

16. The multi-cluster policy consolidation system of claim 1, wherein the policy importer is configured to assign the database records among the plurality of disconnected clusters:
    on a random basis, or
    via load balancing operations based on fullness levels of databases of the plurality of disconnected clusters.

17. The multi-cluster policy consolidation system of claim 1, wherein the consolidating, including the changing of the renewal indicator of the second database record, causes a reduction in an overall number of database records, across the first cluster and the second cluster, that represent active insurance policies that are to be renewed separately.

18. The multi-cluster policy consolidation system of claim 1, wherein:
    the first policy management system and the second policy management system are configured to perform the renewal operations by generating and sending renewal email messages via one or more networks,
    prior to the consolidating, performance of the renewal operations comprises generating and sending a first number of the renewal email messages via the one or more networks, the first number of renewal email messages being associated with:
        a first renewal of the first insurance coverage at a first time by the first policy management system based on the first database record, and
        a second renewal of the second insurance coverage at a second time by the second policy management system based on the second database record; and
    the consolidating, including the changing of the renewal indicator of the second database record, causes the performance of the policy renewal operations to comprise generating and sending a second number of the renewal email messages via the one or more networks, wherein:
        the second number is lower than the first number, and
        the second number of the renewal email messages is associated with a combined renewal of the first insurance coverage and the second insurance coverage together, at the same time, by the first policy management system based on the first database record.

19. The computer-implemented method of claim 6, further comprising:
    detecting, by the policy consolidator, an occurrence of a trigger event associated with at least one of:
        an import of the second database record, corresponding to a source policy, into the second cluster by the policy importer,
        the pending future renewal of the source policy, or
        a consolidation instruction associated with the source policy,
    wherein the policy consolidator determines that the first database record and the second database record are characterized by the set of common attributes, and consolidates of the set of policy data from the second database record into the first database record in response to detecting the occurrence of the trigger event.

20. The one or more computing devices of claim 11, wherein the policy importer is configured to assign the database records among the plurality of disconnected clusters:
    on a random basis, or
    via load balancing operations based on fullness levels of databases of the plurality of disconnected clusters.

* * * * *